May 30, 1950     E. SCHWARZKOPF     2,509,317

JOINT FOR ARTIFICIAL BODY MEMBERS

Filed Sept. 17, 1945

INVENTOR
Emil Schwarzkopf
BY John Flam
ATTORNEY

Patented May 30, 1950

2,509,317

UNITED STATES PATENT OFFICE 2,509,317

JOINT FOR ARTIFICIAL BODY MEMBERS

Emil Schwarzkopf, Los Angeles, Calif.

Application September 17, 1945, Serial No. 616,681

1 Claim. (Cl. 287—100)

This invention relates to joints adapted to support artificial body members.

The joint is useful, for example, as a hip joint to support an artificial limb used in cases where the amputation is above the knee and near the pelvis. It can also be used at the knee joint for supporting an artificial leg in cases where the amputation is below the knee.

Joints for such purposes should be noiseless for obvious reasons. Accordingly, it has been proposed to use a lubricant between the moving parts of the joint. This, however, creates another difficulty; for, often, the lubricant escapes and soils the garments of the wearer.

It is an object of this invention to make it possible to enclose the bearing parts for preventing ingress of dust or other foreign matter, as well as to prevent escape of the lubricant.

It is another object of this invention to make possible the provision of a joint that is noiseless and requires no renewal of lubricant.

It is still another object of this invention to provide enclosures for the rolling bearing elements such that the joint may be disassembled and reassembled without the necessity of disturbing these elements. Accordingly, careless handling of the joint by repair men is not likely to result in the loss of any of the bearing parts.

It is still another object of this invention to provide a sturdy joint structure of this character that can be left without attention for long periods, and that has adequate bearing supporting surfaces in a relatively small space.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings.

Figure 1:
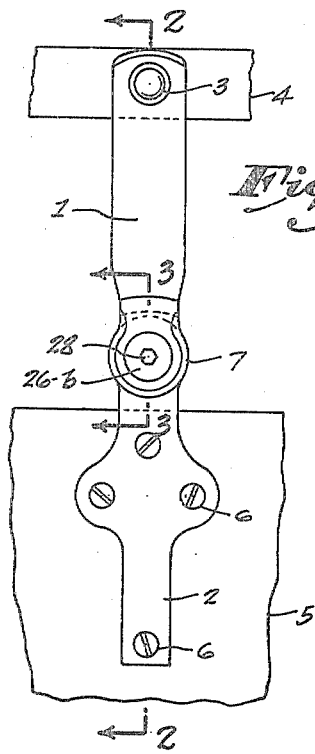
Figure 1 is an elevation of a joint incorporating the invention.
Figure 2:
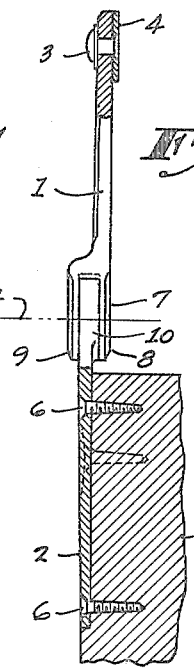
Fig. 2 is an elevation, partly in section, taken as indicated by the line 2—2 of Fig. 1.
Figure 3:
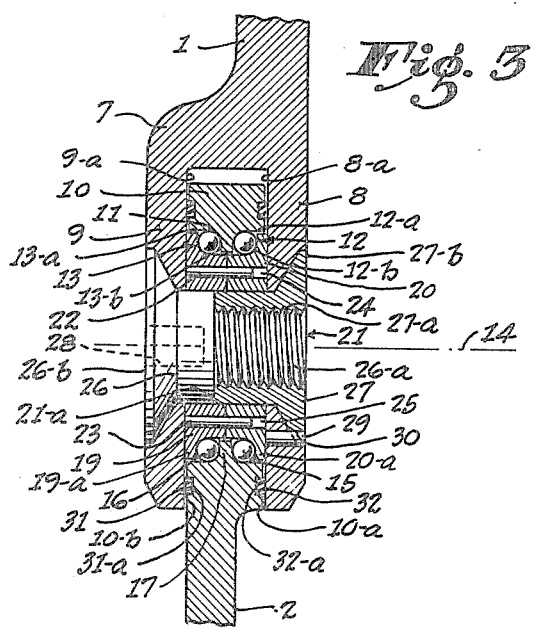
Fig. 3 is a fragmentary section on an enlarged scale, taken as indicated by the line 3—3 of Fig. 1.

The joint structure illustrated in Figs. 1, 2, and 3 includes an upper arm 1 and a lower arm 2, and corresponds to the hip joint of the user. The outer surface of both of these arms are slightly convex, as indicated in Fig. 2, to provide a smooth exterior surface. The upper portion of arm 1 may be pivotally connected, as by the aid of a pin 3, to a belt member 4 that is adapted to be secured about the body of the wearer. The outer surface of the lower arm 2 is shown as flush with the exterior surface of the artificial limb 5. Arm 2 is fastened to limb 5 by a plurality of screws 6.

The lower end 7 of the arm 1, as shown in Figs. 2 and 3, is bifurcated to provide sections 8 and 9 which straddle the upper end 10 of the arm 2. These sections 8 and 9 have spaced parallel plane surfaces 8—a and 9—a between which the end 10 is accommodated, the opposite faces 10—a and 10—b of the end 10 being closely spaced to the surfaces 8—a and 9—a respectively.

The upper end 10, as shown in Fig. 3, is provided with a circular through aperature 11 in which are mounted spaced rolling bearing structures 12 and 13, serving to connect the arms 1 and 2 for movement about an axis 14. The bearing structures 12 and 13 comprise, respectively, a plurality of rolling bearing elements 15 and 16, shown in this instance as hardened steel balls. The aperture 11 is provided with an annular projection or flange 17, the opposite sides of which provide thrust surfaces for the bearing elements 15 and 16, the surface of the aperture 11 serving to support these elements radially. The aperture 11 thus provides the outer races 12—a and 13—a of the bearing structures 12 and 13.

The inner races 12—b and 13—b for the bearing structures are provided, respectively, by washer-like members 19 and 20 carried on a pin structure 21 secured in the bifurcated lower end 7 of the upper arm 1. The members 19 and 20 have, respectively, flanges 19—a and 20—a adjacent their outer ends, which cooperate with the flange 17 to confine the balls 15 and 16. In this way a combined radial and thrust bearing is provided for connecting the arms 1 and 2.

The bearing members 19 and 20 are secured to each other in any convenient way, as, for example, by pins 22 and 23 which are a forced fit in aligned apertures 24 and 25 in the members 19 and 20. In this way, the bearing structures 12 and 13 are maintained in assembled relation in the arm 2, even when separated from the arm 1 by the removal of the pin 21.

This is of considerable importance, since it ensures against loss of any of the bearing elements 15 and 16 by careless workmen, or entry of grit or foreign matter into the bearing structures when necessary to disconnect or disassemble the arms 1 and 2.

The pin 21 is formed of two sections 26 and 27 threadedly joined. One section, as 26, has a reduced threaded portion 26—a accommodated in a threaded bore 27—a in the other section 27. Sections 26 and 27 each have conical heads 26—b and 27—b respectively accommodated in countersunk openings provided on the opposite sides of the bifurcated end 7. When the sections 26 and 27 are in assembled relation, they cooperate to form a cylindrical surface 21—a for mounting the bearing members 19 and 20.

To facilitate assembly and disassembly of the pin 21, section 26 is provided with a non-circular opening 28 adapted to be engaged by a suitable wrench, while the section 27 is restrained from rotating by a pin 29 fixed in the arm 1 and engaging a notch 30 formed in the head 27—b.

The combined thickness of the bearing members 19 and 20 is substantially the same as the space between the end portions 8 and 9 of the arm 1. Thus, when assembled in place on the pin 21, the members 19 and 20 are frictionally restrained against movement about the axis 14. Since free angular movement about this axis is required between the arms 1 and 2, the upper end 10 of the lower arm 2 is of less thickness than this space to provide a clearance of the order of a few thousandths of an inch between the opposite faces 10—a and 10—b of this end 10 and the inner surfaces 8—a and 9—a of the end 7.

The bearing structures 12 and 13 are sealed against ingress of dust or other foreign matter, as well as against the escape of lubricant by sealing rings or gaskets 31 and 32 of suitable resilient material, such as neoprene, interposed respectively between the surfaces 8—a and 10—a, and 9—a and 10—b, and extending about the bearing structures. These rings 31 and 32 are secured to one of the end portions, such as the end portion 10 of the lower arm 2, as by being disposed in suitable grooves 31—a and 32—a and secured in place.

When initially assembled, a small amount of suitable lubricant having a low freezing point is placed in the bearing structures 12 and 13. Due to the sealed construction which prevents escape of this lubricant, renewal or replacement thereof is not required.

Figure 4:
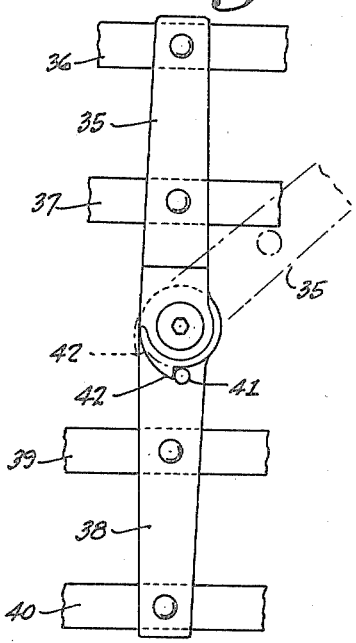
Fig. 4 is an elevation of a modified form of the invention.

The hinge structure can be readily adapted to correspond to the knee joint. Such an adaptation is illustrated in Fig. 4. In this instance, the upper arm 35 is securely attached to the bands 36, 37 that are adapted to encircle the leg above the knee. Similarly, the lower arm 38 may be attached to the lower limb-encircling bands 39, 40. A limit, however, is placed upon the extent of angular movement between the arms. For this purpose, the lower arm 38 carries a stop pin 41 adapted to cooperate with a stop lug or abutment 42 carried by the bifurcated end of the upper arm 35. When these stop elements 41 and 42 are in contact, the knee joint is in a straightened position. In the process of sitting down, or the like, the upper arm 35 is permitted to turn in a clockwise direction, as indicated by the alternative position shown in dot-and-dash lines.

The inventor claims:

In a hinged device: a first arm having a bifurcated end providing substantially plane parallel inner surfaces; a second arm having an apertured ear disposed between said surfaces, said ear having an annular and inwardly directed flange forming a pair of outer races; an inner race member disposed between and engaging the inner surfaces of said bifurcation and having inwardly facing annular shoulders at each side thereof providing inner races opposed to and on opposite sides of said outer races, said inner race member comprising two axially separable elements abutting each other; means interconnecting said axially separable elements to prevent their rotation with respect to each other; a pair of sets of rolling elements disposed between said inner and outer races and separated by said flange; means for retaining said axially separable elements in abutting relation to each other and said inner races and said rolling elements in said apertured ear; and means for clamping said bifurcation to said inner race member with the inner surfaces of the bifurcation engaging the outer surfaces of said inner race member.

EMIL SCHWARZKOPF.

REFERENCES CITED

The following references are of record in the file of this patent:

UNITED STATES PATENTS

| Number | Name | Date |
|---|---|---|
| 467,481 | Hillebrand | Jan. 19, 1892 |
| 620,999 | Wambsgan | Mar. 14, 1899 |
| 847,719 | Arnold | Mar. 19, 1907 |
| 1,008,048 | Mueller | Nov. 7, 1911 |
| 1,363,477 | Lowe | Dec. 28, 1920 |
| 1,365,654 | Bott | Jan. 18, 1921 |
| 2,042,882 | Delaval-Crow | June 2, 1936 |
| 2,134,288 | McCann | Oct. 25, 1938 |

FOREIGN PATENTS

| Number | Country | Date |
|---|---|---|
| 404,600 | France | Dec. 6, 1909 |